Oct. 9, 1951 R. F. WILD ET AL 2,570,739
CONTROL APPARATUS
Filed March 3, 1948 4 Sheets-Sheet 1

FIG. 1

INVENTORS.
RUDOLF F. WILD
FRED J. CURRAN
BY Arthur H. Swanson
ATTORNEY

R. F. WILD ET AL

2,570,739

CONTROL APPARATUS

Filed March 3, 1948

INVENTORS.
RUDOLF F. WILD
FRED J. CURRAN
BY
Arthur H. Swanson
ATTORNEY

FIG. 4

Patented Oct. 9, 1951

2,570,739

UNITED STATES PATENT OFFICE 2,570,739

CONTROL APPARATUS

Rudolf F. Wild, Wilmington, Del., and Fred J. Curran, Philadelphia, Pa., assignors, by mesne assignments, to Minneapolis-Honeywell Regulator Company, Minneapolis, Minn., a corporation of Delaware Application March 3, 1948, Serial No. 12,873

6 Claims. (Cl. 178—19)

The present invention relates to improvements in electrical systems, and more especially, to electrical systems for transmitting intelligence from a transmitting station to one or more separate and remotely located receiving stations.

An object of the invention is to provide improvements in electrical systems whereby an electron discharge device may simultaneously serve the dual function of keying or intermittently blocking one oscillation generator while amplifying the oscillating output signal of a second oscillation generator.

Another object of the invention is to provide improvements in electrical telautograph systems to the end that a combination of frequencies of two electrical signals representative of the intelligence to be transmitted may be amplified by the same amplifier and transmitted to the remote receiving station or stations over the same transmission circuit. To this end, means are provided at the receiving station or stations as well as at the transmitting station for separating the electrical signals received and for utilizing them automatically to adjust a receiver exhibiting element in accordance with the intelligence under transmission.

Considered in its more specific aspects, the invention relates to transmission systems of the type in which the position of a point to be transmitted is considered in terms of the position of that point with respect to a pair of coordinate axes. The coordinates employed may be either rectangular or polar coordinates, as desired. When rectangular coordinates are employed, the position of the point to be transmitted, for example, is considered in terms of distance between the point and each of two mutually perpendicular lines comprising the coordinate axes. If the magnitude of the deviation in position of the point from each of the coordinate axes is transmitted to a remotely located receiving station, the two deviations can be combined at the remote station to there cause a marking element to assume a corresponding position relative to similar coordinate axes located at that station.

According to the present invention, two separate tuned oscillating circuits are provided at the transmitter for producing two high frequency oscillating electrical currents each corresponding in frequency to one coordinate of a marking element at the transmitter. Both high frequency signals are amplified by the same amplifier and are transmitted by the same transmission circuit to the remotely located receiving station where a marking element is positioned in each coordinate according to the frequency of the corresponding received signals, thereby reproducing the changes of position of the marking element at the transmitter.

It is a specific object of the invention, therefore, to provide improvements in electrical telautograph systems to the end that the high frequency signals representative of the position of the marking element at the transmitter may be amplified by a common amplifier and transmitted over a common transmission circuit to the remote receiving station or stations. It is a specific object also to provide in conjunction with such transmission apparatus means at the remotely located receiving station or stations for separating the high frequency signals received and for utilizing them to adjust automatically a receiver marking element to a position corresponding to the position of the transmitter marking element.

This application is a division of our prior application Serial No. 620,829, filed on October 6, 1945, which issued as Patent No. 2,457,790 on December 28, 1948.

The various features of novelty which characterize our invention are pointed out with particularity in the claims annexed to and forming a part of this specification. For a better understanding of the invention, however, its advantages, and specific objects attained by its use, reference should be had to the accompanying drawings and descriptive matter in which we have illustrated and described preferred embodiments of the invention.

Figure 1:
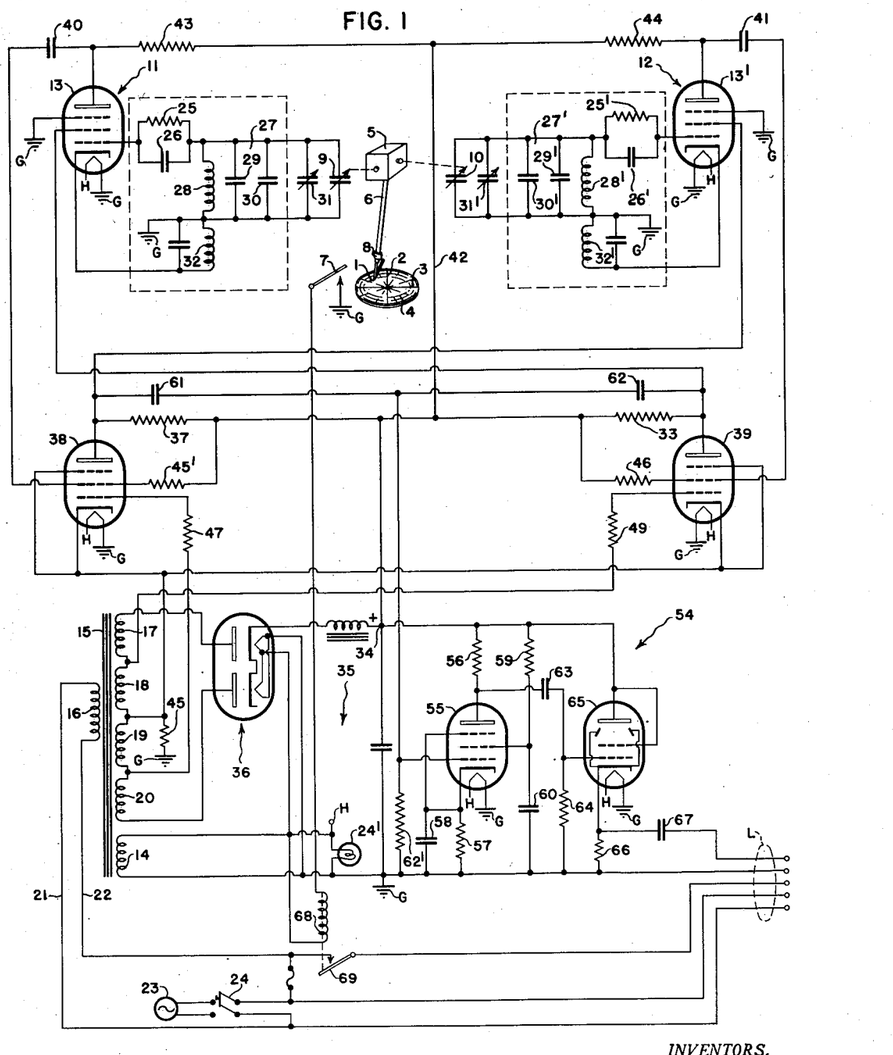
Fig. 1 illustrates a wiring diagram of the transmitter mechanism of a preferred embodiment of our invention.

In Fig. 1 there is illustrated a transmitter embodying the principles of our invention for producing two separate variable frequency high frequency oscillating currents, each corresponding in frequency to the deviation of a marking element I from two mutually perpendicular lines or coordinate axes which have been designated by the reference characters 2 and 3, respectively, and are drawn on a plotting board or table 4. The marking element 1 may comprise either a pen or a pencil and for purposes of illustration will be considered to be a pencil.

Data are plotted on the plotting board 4 with the pencil 1, the latter being suspended by a holder 6 from a so-called transmitting head indicated generally by the reference character 5. The transmitting head 5 has been shown in very diagrammatic manner in Fig. 1, inasmuch as the details of that device comprise no part of the present invention, since that device is the invention of George W. Barnes, Jr., John F. Goetz, and Walter P. Wills and is disclosed in an application, Ser. No. 620,827, now Patent No. 2,508,592 of May 23, 1950. A writing handle is preferably attached to the holder 6 for the pencil to facilitate the plotting of information to be transmitted on the plotting board 4. The pencil, when not in use, is automatically lifted from the plotting board 4 by spring means located within the holder 6 and disclosed in detail in the Barnes, Goetz, and Wills application. A switch 7 is provided in the pencil holder 6 for actuation by writing pressure of the pencil on the plotting board for the purpose of actuating a solenoid at the remotely located receiver shown in Fig. 2 so that the marking element at the receiver is adapted to engage the recording chart only when the transmitter pencil is in contact with the plotting board. A knurled nut 8 at the top of the pencil holder is provided to permit the latter to be turned, whereby plotting can be done from any side of the plotting board. After the pencil holder has been adjusted to a desired position, the knurled nut is tightened.

The transmitting head includes certain of the electrical components of the transmitting mechanism and in particular houses variable electrical condensers 9 and 10, and also includes suitable cams and gimbal joints so that the condenser 9 is arranged to be varied in capacity in accordance with the movements of the pencil 1 along one coordinate, for example, along the coordinate 2, while the condenser 10 is arranged to be varied in capacity in accordance with the movements of pencil 1 in the other coordinate. The cams referred to serve a compensating purpose required because the angle of the deflection of the pencil holder 6 is not directly proportional to the linear movement of the pencil 1 along the plotting board. The transmitter head also includes two electrical oscillation circuits 11 and 12, respectively associated with condensers 9 and 10.

Oscillation circuits 11 and 12 may be and are shown as being identical to each other, and therefore, only oscillation circuit 11 will be described. Components of the oscillation circuit 12 corresponding to those of the oscillation circuit 11 have been indicated by the same reference numeral with a prime figure added.

Oscillation circuit 11 comprises an electron coupled oscillator and includes a pentode tube 13 which may be of the commercially available type 6SJ7. Tube 13 includes an anode, a suppressor grid, a screen grid, a control grid, a cathode and a heater filament. The heater filament is connected to and receives energy from the secondary winding 14 of a combination stepup-stepdown transformer 15 having a line voltage primary winding 16 and high voltage seconding windings 17, 18, 19, and 20 in addition to the secondary winding 14. The terminals of the primary winding 16 are connected by conductors 21 and 22 to a commercial source of alternating current 23, through a double pole-single throw switch 24 and a fuse provided to protect the apparatus from damage due to excessive currents resulting from failure of a component of the apparatus. A lamp 24' connected across the terminals of transformer secondary winding 14 is employed to provide a visual indication that the switch 24 is closed and the apparatus is powered for operation.

The control grid of tube 13 is connected through a parallel connected resistance 25 and condenser 26 to one terminal of a parallel circuit 27, the other terminal of which is connected to ground G. The parallel circuit 27 includes in one branch an inductance coil 28 and includes condenser 9 in another branch. The other branches of the parallel circuit respectively include condensers 29, 30, and 31. Condenser 31 is shown as adjustable in capacity and is provided for the purpose of providing a fine adjustment for the zero setting of the pencil 1 along the coordinate 2. Preferably the condenser 31 is provided with a suitable knob or kerf to facilitate its adjustment. Condenser 29 preferably is of the type having a negative temperature coefficient of capacitance and is provided to compensate for the effect of ambient temperature variations upon the frequency of the oscillating current generated by oscillator 11.

The cathode of tube 13 is connected to ground G through an inductance coil 32 which is disposed in inductive relation to the coil 28 and serves the purpose of feeding back energy from the output circuit of the tube 13 to the circuit of the control grid for maintaining the circuit 11 in an oscillating state.

As shown, the screen grids of tubes 13 and 13' are connected through respective resistors 33 and 37 to the positive terminal 34 of a filter indicated generally by the reference character 35 and having its input terminals connected to the output terminals of a full wave rectifier designated by the character 36. The suppressor grids of tubes 13 and 13' are connected directly to ground G.

The oscillating circuit of oscillator 11 includes the control grid circuit of which the parallel circuit 27, including the variable condenser 9, forms a part and also includes the screen grid circuit, which may be traced from the positive terminal 34 through resistance 33, the screen grid of tube 13, the cathode thereof, and inductance coil 32 to ground G, which, as shown, constitutes the negative output terminal of the filter 35. The screen grid and control grid circuits are inductively coupled by the inductance coils 28 and 32 and provide for high frequency operation through a range varying from approximately 390 to 470 kilocycles, depending upon the position along the coordinate 2 of the pencil 1. Similarly, the inductance coils 28' and 32' of oscillation circuit 12 provide for high frequency operation through a frequency range varying from approximately 390 to 470 kilocycles, depending upon the position of the transmitter pencil 1 along the coordinate 3. Accordingly, the oscillation circuits 11 and 12 each produce a high frequency oscillating current having a frequency within the range of 390 to 470 kilocycles, depending upon the position to which the pencil 1 of the transmitter is moved relatively to the coordinates 2 and 3.

Energizing current is supplied the anode circuits of the oscillation circuits 11 and 12 from the rectifier 36 and filter 35 through a circuit which may be traced from the output terminal 34 of filter 35 through a conductor 42 to the junction of a pair of resistors 43 and 44. The other terminal of resistor 43 is connected to the anode of tube 13 of oscillation circuit 11, while the other terminal of resistor 44 is connected to the anode of tube 13' of oscillation circuit 12. The cathodes of tubes 13 and 13' are connected through their respectively associated feedback coils 32 and 32' to ground G and thereby to the negative output of filter 35. It is noted that ground G is connected by a resistor 45 to the junction of the transformer secondary windings 18 and 19 whereby the potential of the junction point of windings 18 and 19 is maintained suitably negative with respect to ground potential.

In order that both of the high frequency oscillating signals generated by the oscillation circuits 11 and 12 may be amplified by a common amplifier and both amplified quantities may be conducted over the same transmission lines to the remotely located receiving station, the oscillating currents produced by the oscillation circuits 11 and 12 are alternately interrupted at suitable frequency, and in patricular, at the frequency of the voltage supplied by source 23. To this end there are provided keying and amplifying tubes 38 and 39. Tubes 38 and 39 also serve as buffer tubes to increase the stability of the respectively associated oscillation circuits 11 and 12 by reducing fluctuations in the oscillation circuit loads. As shown, each tube includes anode, suppressor grid, screen grid, control grid, cathode, and heater filament elements. Energizing current is supplied each of the heater filament elements from the low voltage secondary winding 14.

The output circuit of the oscillation circuit 11 is coupled by means of a condenser 40 to the screen grid of tube 38 for amplifying and transmission purposes, while the output circuit of oscillation circuit 12 is coupled by means of a condenser 41 to the screen gird of tube 39 for the same purposes.

Energizing current is supplied the anode circuits of the tubes 38 and 39 from the rectifier 36 and filter 35 through a circuit which may be traced from the positive output terminal 34 of the filter to the junction of resistors 33 and 37. The other terminal of resistor 37 is connected to the anode of tube 38, while the other terminal of resistor 33 is connected to the anode of tube 39. The cathodes of tubes 38 and 39 are connected together and to the junction of transformer secondary windings 18 and 19. Since the potential of the last mentioned junction point is negative with respect to ground by an amount determined by the magnitude of resistor 45 and the magnitude of current flowing through it, the anode voltage impressed on the tubes 38 and 39 is of corespondingly greater magnitude than that impressed on the anode circuits of tubes 13 and 13. Resistor 45, accordingly, is so chosen as to provide the proper operating anode voltages for tubes 38 and 39.

The suppressor grids of tubes 38 and 39, as shown, are directly connected to the cathodes of said tubes.

Energizing voltage is supplied the screen grids of tubes 38 and 39 from the rectifier 36 and filter 35 through a circuit which may be traced from the filter output terminal 34 to the junction point of resistors 45' and 46. The other terminals of resistors 45' and 46 are connected to respective screen grids of tubes 38 and 39.

Separate alternating voltages 180° out of phase with each other are impresed on the control grids of tubes 38 and 39 from the transformer secondary windings 19 and 18, respectively. Specifically, the cathodes of tubes 38 and 39, as previously noted, are connected together and to the junction point of windings 18 and 19. The other terminal of winding 19 is connected through a resistor 47 to the control grid of tube 38, while the other terminal of winding 18 is connected through a resistor 49 to the control grid of tube 39. The alternating voltages thus impressed on the control grids of tubes 38 and 39 are of the proper magnitude to render the tubes 38 and 39 non-conductive during alternate half cycles of the alternating voltage supplied from the alternating current source 23.

In order to periodically interrupt the oscillating signals generated by the oscillation circuits 11 and 12 at the frequency of the alternating voltage supplied from source 23, the screen grid of tube 13 is connected to the junction of resistor 33 and the anode of tube 39 and the screen grid of tube 13' is connected to the junction of resistor 37 and the anode of tube 38. When tubes 38 and 39 are rendered conductive, the potential of their respectively associated anodes decreases with respect to ground potential. The reduced anode voltages are sufficiently low when applied to the screen grids of tubes 13 and 13' to cause the latter tubes to be rendered non-conductive. Hence, tube 13 is arranged to be rendered non-conductive during the half cycle that tube 39 is conductive. During that half cycle tube 38 is non-conductive, and in consequence, tube 13' will be conductive and an oscillating signal will be produced by oscillation circuit 12. In the next half cycle tube 38 will be conductive and the oscillating signal produced by the oscillation circuit 12 will be interrupted. During this latter half cycle the tube 39 will be non-conductive, and as a result the oscillation circuit 11 will be operative to produce an oscillating signal. The fluctuating voltages so created and impresed on the screen grids of oscillator tubes 13 and 13' change rapidly from a value at which the oscillators are permitted to oscillate to a value at which oscillation is interrupted, and consequently, the interruption and initiation of the state of oscillation of tubes 13 and 13' is clean and sharp.

Specifically, assume that the voltage applied to the control grid of tube 38 is traversing its positive half cycle while the voltage applied to the control grid of tube 39 is traversing its negative half cycle. The amplitude of the voltage applied to the control grid of tube 39 is sufficient to quickly block or cut off conduction through tube 39. Therefore, this tube is effectively eliminated from the circuit and the screen grid of oscillator tube 13 receives its full operating voltage from the output terminal 34 of the filter 35. It is important to note that during operation of the oscillation circuit 11, the operating voltages applied to the electrodes of tube 13 are constant for all practical purposes and consequently no frequency modulations occur due to periodically varying values of operating voltages.

During the half cycle under consideration tube 38 is conducting and the steady D. C. component of its anode current effects a sharp decrease in the voltage of its anode, which voltage is also the voltage applied to the screen grid of oscillator tube 13', to such a value that conduction through the oscillator tube 13' is suddenly cut off. It is noted that cut off of tube 13' is readily accomplished because the anode voltage of tube 38 may become zero or even go slightly negative with respect to the potential of the cathode of tube 13' and still provide an operating voltage for the anode of tube 38 of amount sufficient to maintain conduction through tube 38. This operation is made possible because of the negative voltage applied to the tube 38 cathode by virtue of the latter's connection to the junction of transformer secondary windings 18 and 19, which, as previously indicated, is negative with respect to ground potential.

In the half cycle under consideration the tube 38 is utilized as a buffer for the oscillation circuit 11 and also serves to amplify the oscillations produced by that oscillation circuit. To this end, the anode of tube 13 is connected by condenser 40 to the screen grid of tube 38. It is noted that the circuit constants are not critical as long as the most positive voltage which the anode of tube 38 may assume during this interval determined by the direct current and radio frequency voltage drop across the anode resistor 37 is sufficient to prevent oscillation of the oscillation circuit 12.

For the next half cycle of the voltage supplied by source 23, the reverse of the above conditions exists. That is to say, tubes 38 and 13 are cut off while tubes 39 and 13' are rendered conductive. Hence, during this half cycle the oscillation circuit 12 produces an oscillating signal and this oscillating signal is amplified by tube 39 which also serves a buffer purpose. To this end, the anode of tube 13' is connected through condenser 41 to the screen grid of tube 39.

As those skilled in the art will recognize, it is possible to utilize in place of the tubes 38 and 39, tubes such as the commercially available type 6L7, or any other frequency mixer or pentagrid converter tube conventionally used in heterodyne radio broadcast receivers. Such tubes are provided with two control grids, and therefore the oscillating signals from the oscillation circuits 11 or 12 to be amplified may be applied to one control grid while the keying voltage derived from the transformer secondary windings 18 and 19 is applied to the other control grid. The use of such tubes in place of the tubes 38 and 39 is advantageous in that the oscillating signals to be amplified are also applied to a control grid, and therefore, will be amplified to a higher degree than they are when applied to a screen grid as shown in Fig. 1.

Figure 3:
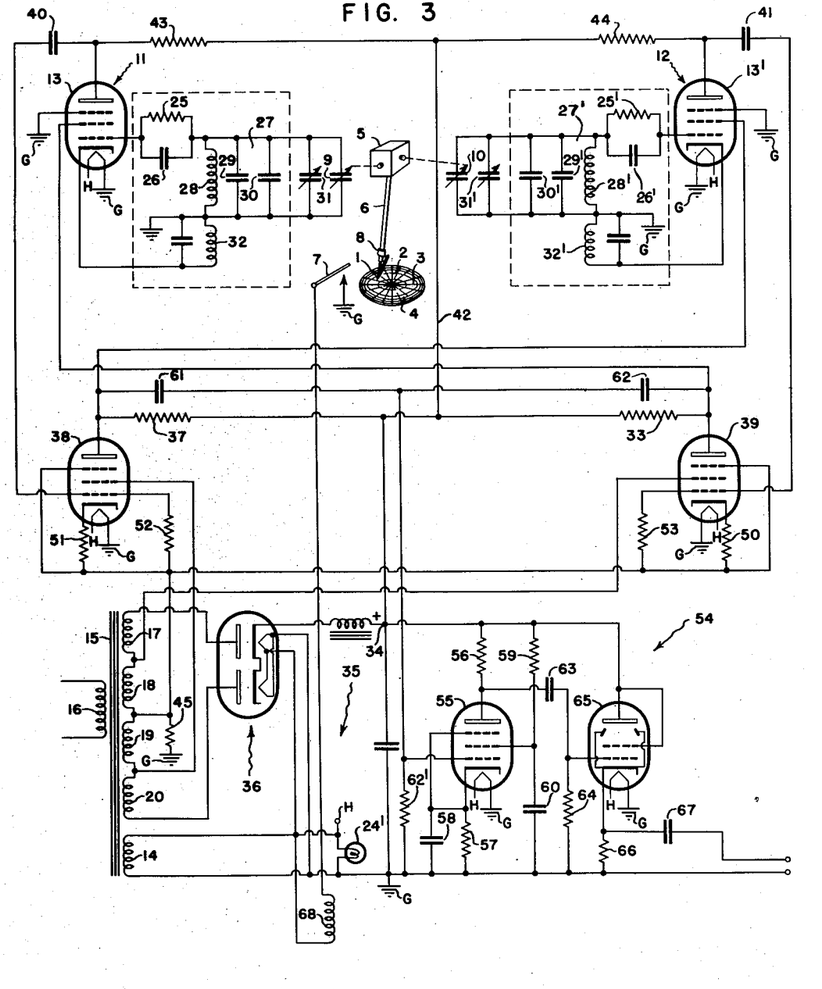
Fig. 3 illustrates a modification of the transmitter mechanism of Fig. 1.

In Fig. 3 we have illustrated another modification of the arrangement of Fig. 1 for alternately interrupting the oscillating signals produced by the oscillation circuits 11 and 12 and for amplifying those oscillating signals. The circuit arrangement of Fig. 3 is substantially identical to that of Fig. 1 with the exception that the keying voltages from the transformer secondary windings 18 and 19 are impressed on the screen grids of tubes 38 and 39 and the oscillating signals to be amplified are impressed on the control grids of those tubes. Specifically, the voltage of the transformer secondary winding 18 is impressed on the screen grid of tube 39 through a circuit which may be traced from the said screen grid through the winding 18 and through a biasing resistor 50 to the cathode of tube 39. Similarly, the voltage of winding 19 is impressed on the screen grid of tube 38 through a circuit which may be traced from the said screen grid through winding 19 and through a biasing resistor 51 to the cathode of tube 38.

The oscillating signals produced by oscillator 11 are impressed on the control grid of tube 38 through condenser 40, while the oscillation signals produced by oscillator 12 are impressed through condenser 41 on the control grid of tube 39. As shown, the control grids of tubes 38 and 39 are connected by individually associated resistors 52 and 53 to the negative terminals of biasing resistors 50 and 51, which terminals are connected together and to the junction of transformer secondary windings 18 and 19.

The manner of operation of this modification of our invention is otherwise the same as that shown in Fig. 1, and hence, further description thereof is believed unnecessary. Here again circuit constants are not critical, as long as the most positive voltage which the anodes of tubes 38 and 39 may assume during the alternate half cycles that they are conductive is sufficiently low to prevent operation of the respectively associated oscillation circuits 12 and 11.

From the foregoing description it is evident that in each contemplated embodiment of my inventions, the interruption of the oscillating signals produced by the oscillation circuits 11 and 12 are timed so that oscillation circuit 11 generates an oscillating signal only when the oscillation circuit 12 is cut off and vice versa. Moreover, the interruption of the oscillating signals from the oscillation circuits 11 and 12 occurs at the frequency of the alternating voltage supplied from the source 23. In other words, during one half cycle of the alternating voltage supplied by source 23, the oscillation circuit 11 is operative to generate an oscillating signal and that oscillation signal is amplified by the tube 38. During the next alternate half cycle the oscillation circuit 12 is operative to generate an oscillating signal and that signal is amplified by the tube 39. Therefore, the tubes 38 or 39 which generate a voltage for interrupting one of the oscillating signals are also used to amplify the output of the other oscillation circuit during the cut off period of the first oscillation circuit. The second tube 38 or 39 which generates a voltage for interrupting the other oscillation circuit performs a similar amplifying function for the first oscillating circuit. This amplification stage comprising tubes 38 and 39, as previously noted, also serves to increase the stability of the oscillation of oscillation circuits 11 and 12 by reducing fluctuations in the oscillation circuit loads.

In order to further amplify the oscillating signals generated by the oscillation circuits 11 and 12 sufficiently for transmission of those oscillating signals to the remotely located receiving station or stations, there is provided an additional amplifier indicated generally by the reference character 54. This amplifier 54 also performs the additional function of matching the impedance of the output circuit of the transmitter to that of the receiving circuit to obtain maximum power transference.

As shown, the transmiter amplifier 54 includes a tube 55 which may desirably be of the commercially available type 6AC7 and includes anode, suppressor grid, screen grid, control grid, cathode, and heater filament elements. Anode voltage is supplied tube 55 from the rectifier 36 and filter 35 through a circuit which may be traced from the positive output terminal 34 of the filter through a resistor 56 to the anode of the tube 55, the cathode thereof, and through a biasing resistor 57, shunted by a condenser 58, to ground G and thereby to the negative output terminal of the filter.

Energizing voltage is supplied to the screen grid of tube 55 through a circuit which may be traced from the positive output terminal 34 of the filter through a resistor 59 to the screen grid, the cathode and the parallel connected resistor 57 and condenser 58 to the negative and grounded output terminal of the filter. The screen grid is also connected by a condenser 60 to ground. The suppressor grid is connected directly to the cathode of tube 55.

The output circuits of the keying and amplifying tubes 38 and 39 are coupled in parallel to the input circuit of the tube 55. Specifically, the anodes of both tubes 38 and 39 are connected by respective condensers 61 and 62 to the control grid of tube 55 which, as shown, is also connected by resistor 62' to ground G, and the cathodes of tubes 38 and 39 are connected through resistor 45 to ground G and through the parallel connected resistor 57 and condenser 58 to the cathode of tube 55. Tube 55, therefore, operates to amplify the oscillating signals in the output circuits of both tubes 38 and 39. The amplified quantity derived from tube 55 is resistance coupled by means of a condenser 63 and a resistor 64 to the input circuit of a tube 65 which is provided for the purpose of matching the impedance of the output circuit of transmitter amplifier 54 to the characteristic impedance of a transmission line connecting the transmitter to the remotely located receiver.

Tube 65 may be of the commercially available type 6V6 and includes an anode, a screen grid, a control grid, a cathode, a heater filament, and also a pair of beam forming plates. Energizing voltage is supplied to the anode circuit from the rectifier 36 and filter 35 through a circuit which may be traced from the positive output terminal 34 to the anode of tube 65, the cathode thereof, and through an output resistor 66 to the negative and grounded terminal of the filter. Energizing voltage is supplied the screen grid of tube 65 through the same circuit. The beam forming plates, as shown, are directly connected to the cathode. The control grid of tube 65, as shown, is directly connected to the junction of condenser 63 and resistor 64 and thereby is coupled to the output circuit of tube 55.

While the rectifier 36, filter 35, and transmitter amplifier 54 have been shown in Fig. 1 as being located closely adjacent the plotting board 4, it will be understood that, if desired, these components may be located at a distance with respect to the plotting board and also with respect to the oscillation circuits 11 and 12. For example, in some applications it may be desired to locate the plotting board 4 and the oscillation circuits 11 and 12 in one room and to have the rectifier 36, filter 35, and the transmitter amplifier 54 in another room to the end that the transmitting mechanism visible for manipulation by an operator may be made less cumbersome and bulky. This feature is also advantageous when the transmission system of the present invention is utilized on shipboard in which the space available is at a premium and would preclude the location of all of the transmitting equipment closely adjacent the plotting board 4 and overhead transmitter unit 5. In a practical operating embodiment of the present invention, a shielded cable 25 feet long is provided between the plotting board and the circuit components including the rectifier 36, filter 35, and amplifier 54.

Tube 65 is connected to operate as a cathode follower, that is to say, the output signal which is transmitted to the receiver is derived from the resistor 66 connected in the cathode circuit of the tube. Resistor 66 is so chosen as to have a characteristic impedance approximating that of the transmission line L connecting the transmitter to the receiver. As shown, the terminal of resistor 66, which is connected to the cathode of tube 65, is coupled by a condenser 67 to one terminal of the transmission line L, while the other and grounded terminal of the resistor 66 is connected directly to another terminal of the transmission line.

At the transmitter amplifier 54 there is also provided a relay 68, one terminal of the operating coil of which is connected to the ungrounded side of transformer secondary winding 14 and the other terminal of which is arranged to be connected to the grounded side of winding 14 upon closure of the switch 7 attached to the writing pencil or stylus 1. To this end, one terminal of the switch 7, as shown, is connected directly to ground G. When the switch 7 is closed, as upon movement of the pencil 1 into engagement with the plotting board 4, the relay 68 is energized and closes an associated switch 69 to energize a solenoid 70 attached to the recording pen mechanism in the receiving unit to move the pen into engagement with the recording chart. When the switch 7 is open and the relay 68 is deenergized, the switch 69 is also open, and the pen at the receiving unit is moved out of engagement with the recording chart by the action of gravity, the solenoid 70 then being deenergized.

As has been previously mentioned, the apparatus located at the remote station, where the transmitted writing or other data is to be reproduced, is arranged to translate the adjustable frequencies of the oscillating signals generated by the oscillation circuits 11 and 12 into two coordinates of pen position. More specifically, the receiving apparatus operates to move the recording pen in a vertical direction in accordance with the variations in frequency of the oscillation signal generated by the oscillation circuit 11, and operates to move the recording pen in a horizontal direction in accordance with the frequency variations of the oscillation signal generated by the oscillation circuit 12. In this manner the changes in position of the pencil or stylus along the plotting board 4 at the transmitter may be exactly reproduced at the receiving apparatus.

Figure 2:
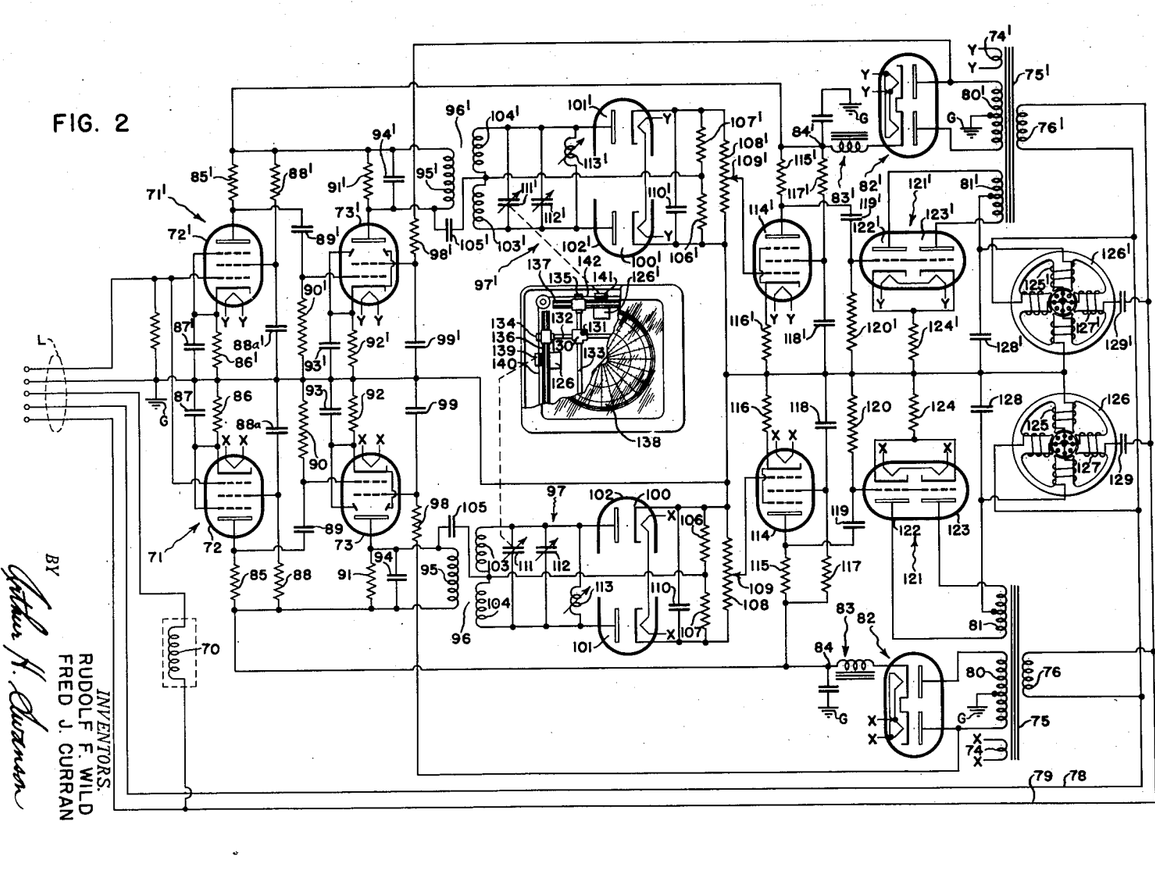
Fig. 2 illustrates a wiring diagram of a preferred form of receiver mechanism which may be employed in connection with the transmission mechanism of Fig. 1.

By reference to Fig. 2, it will be noted that two independent receiving circuits are provided. One of the receiving circuits controls the movement of the recording pen in one coordinate, for example, the horizontal coordinate, and the other receiving circuit controls the recording pen in the vertical coordinate. The oscillating signals derived from each of the oscillation circuits 11 and 12 and transmitted to the receiver over the transmission line L are impressed on both of the input circuits of the two receiving circuits. The receiver mechanism is so arranged that one of the receiving circuits is responsive only to the oscillating signal generated by the oscillation circuit 11, and the second receiving circuit is responsive only to the oscillating signal generated by the other oscillation circuit 12 to control the energization of individually associated reversible motors, which in turn are linked by suitable mechanical means to the recording pen to position the latter in the two coordinates along the recording chart. The operation of the two receiving circuits is the same, and the following explanation applies to both circuits. One of the receiving circuits has been generally indicated by the reference character 71 and the other by the reference character 71'. The elements of the receiving circuit 71' corresponding to those of the receiving circuit 71 have been indicated by the same reference numerals with a prime figure added.

The receiver 71 includes two stages of amplification, the first of which utilizes an amplifying tube 72 of the commercially available type 6AC7 and the second of which utilizes an amplifying tube 73 of the type 6V6. In the second stage of amplification the two oscillating signals from the transmitter are separated and one of them is rejected. In other words the second stage of amplification responds only to the oscillating signal generated by one of the oscillation circuits 11 or 12 and, for purposes of illustration, will be assumed to respond only to the oscillating signal generated by the oscillation circuit 11. Rejection of the oscillating signal from the oscillation circuit 12 is accomplished in a manner described in detail hereinafter, and generally speaking, involves the application of an alternating voltage derived from source 23 to periodically interrupt the conduction of tube 73. The oscillating signal after rejection of the undesired portion consists of a radio frequency wave which is periodically interrupted at the frequency of the voltage supplied by the source 23 and has been illustrated schematically in graphs (b) and (bb) of Fig. 4 which show the oscillating signal frequency as being higher and lower, respectively, than a frequency value at which the receiving pen is held motionless along the vertical coordinate.

Tube 72, as shown, includes anode, suppressor grid, screen grid, control grid, cathode, and heater filament elements. Energizing current is supplied the heater filament from the low voltage secondary winding 74 of a transformer 75 having a line voltage primary winding 76 which is connected by conductors 78 and 79 to the alternating voltage source 23. To this end the conductors 78 and 79 are included in the shielded cable L connecting the transmitter to the receiver. The transformer 75 also includes high voltage secondary windings 80 and 81, both of which are provided with a center tap.

Energizing voltage is supplied to the anode of tube 72 from a full wave rectifier indicated generally by the reference numeral 82 and a filter indicated at 83. The rectifier 82, energized by the transformer secondary winding 80, provides a voltage at the output terminal 84 of the filter 83 which is suitably positive with respect to the potential of ground G to which the negative terminal of the filter is connected. As shown, the positive terminal 84 is connected through a resistor 85 to the anode of tube 72, and the cathode is connected through a parallel connected resistor 86 and condenser 87 to ground G. Energizing voltage is supplied to the screen grid of tube 72 from the positive filter output terminal 84 through a circuit, including a resistor 88, to the screen grid and from the cathode through the parallel connected elements 86 and 87 to ground G. The screen grid of the tube 72 is directly connected to ground G by a condenser 88a.

As may be seen by reference to Figs. 1 and 2, the output terminal of resistor 66 of the transmitter amplifier 54, which is connected to the cathode of tube 65, is connected by condenser 67 and the shielded transmission line L to the control grid of tube 72. The other and grounded output terminal of the transmitter amplifier 54 is connected through the transmission line L to the parallel connected resistor 86 and condenser 87 and thereby to the cathode of tube 72.

The output circuit of tube 72 is coupled by a condenser 89 and a resistor 90 to the input circuit of tube 73. Tube 73 includes an anode, a screen grid, a control grid, a cathode, a heater filament, and beam forming plates. Energizing current is supplied to the heater filament from the low voltage transformer secondary winding 74.

Anode voltage is supplied to tube 73 through a circuit path which may be traced from the positive output terminal 84 of the filter 83 through a parallel network including in one branch the primary winding 95 of a transformer 96 to the anode of tube 73, the cathode thereof, and a parallel connected resistor 92 and condenser 93 to the grounded and negative terminal of the filter. The other branches of the parallel network respectively include a resistor 91 and a condenser 94. The transformer 96 comprises a part of a frequency discriminator indicated generally by the reference numeral 97 and includes a split secondary winding in addition to the primary winding 95.

The beam forming plates of tube 73 are directly connected to the cathode, and the control grid is coupled to the output circuit of tube 72 by virtue of its connection to the junction of condenser 89 and resistor 90.

Alternating voltage is impressed on the screen grid of tube 73, for periodically rendering it non-conductive, from one half of the center tapped transformer secondary winding 80 through a circuit which may be traced from lower terminal of the winding 80, as seen in the drawing, through a resistor 98 to the screen grid of tube 73 and through the parallel connected elements 92 and 93 to ground and thereby to the center tap on winding 80. The screen grid of tube 73 is also connected directly to ground G by a condenser 99. The magnitude of the alternating voltage impressed on the screen grid of tube 73 is so chosen as to be sufficient to cause the tube 73 to be rendered non-conductive or cut off during thosse half cycles of the voltage of source 23 in which the screen grid is driven in the negative direction. Furthermore, the phase of this alternating voltage is such that the tube 73 is operative to amplify the oscillating signals generated by the oscillation circuit 11 and transmitted to the receiver 71 only during those alternate half cycles of the supply line voltage in which the oscillation circuit 11 is operative to generate an oscillating signal.

It is noted that the entire transmission system receives energizing current from the single source 23 of alternating current. This source, as described, is located at the transmitter amplifier unit and the alternating current utilized for energizing the receiving units is transmitted from the source 23 by way of the transmitting cable L. This is done to insure synchronism of the keying action of the transmitter and receiver units and also provides the advantage of permitting the installation and use of receivers at locations where there is not available alternating power of the same frequency and phase as that delivered by source 23.

The frequency discriminator 97, previously referred to, includes in addition to the transformer 96 a pair of diode rectifiers 100 and 101, which desirably may be contained within a single envelope, generally designated at 102. One half of the split secondary winding of the intermediate frequency transformer 96 has been designated by the numeral 103 and the other half by the numeral 104. The center tap of the split secondary winding comprising the junction of winding sections 103 and 104 is connected through a blocking condenser 105 to the anode circuit of tube 73, and more specifically, to the terminal of the primary winding 95 which is connected to the anode of the tube 73. The center tap of the split secondary winding is also connected to the point of engagement of a pair of resistors 106 and 107. The resistors 106 and 107 are shunted by a resistor 108 which is provided with an adjustable tap 109. The usable output voltage from the frequency discriminator is obtained across the resistor 108 which, as shown, is shunted by a condenser 110.

The diode rectifiers 100 and 101 may be contained within a single tube such as the commercially available type 6H6. Each diode includes anode, cathode, and heater filament elements. The heater filament elements are connected in series with each other and receive energizing current from the transformer secondary winding 74. The cathodes of the diodes 100 and 101 are connected through resistors 106 and 107, respectively, to the junction of the transformer secondary windings 103 and 104. The other terminal of the winding 103 is connected to the anode of diode 100, while the other terminal of the winding 104 is connected to the anode of the diode 101.

For tuning the secondary winding of the transformer 96 to the frequency of the oscillating signals impressed thereon from the output circuit of tube 73, a variable condenser 111 is provided. This variable condenser is arranged to be automatically adjusted in capacity as required to maintain the secondary winding of the intermediate frequency transformer 96 tuned to the frequency of the applied oscillating signals. A variable condenser 112 and a variable inductance 113 are connected in shunt with the secondary winding of the transformer 96 for a purpose which will be later explained.

The blocking condenser 105 and the condenser 110 are so selected as to present low impedance to the radio frequency oscillating currents flowing through them. The condenser 94 and the transformer primary winding 95 connected in parallel therewith are so selected as to provide high impedance in order to produce a large output signal from the discriminator. Preferably the primary winding 95 is tuned to a value which is outside the range of frequency variation of the oscillating signals generated by the oscillation circuit 11 at the transmitter and impressed on the receiver circuits. By way of example it is noted that satisfactory operation has been obtained when the primary winding 95 is tuned to a frequency of 325 kilocycles. The tuning of the primary winding 95 to this value which is below the operating range of frequency variation of the oscillating signals conveyed by the transmission line L to the receiver 71 constitutes no part of the present invention but is the sole invention of the joint applicant Rudolf F. Wild and is being disclosed and claimed in application, Ser. No. 620,831, filed October 6, 1945, now Patent No. 2,473,401 of June 14, 1949.

The frequency discriminator 97 together with the diodes 100 and 101 is provided for the purpose of deriving a voltage having an alternating component of one phase or of opposite phase and of the same frequency as the voltage supplied by source 23 accordingly as the frequency of the oscillating signal impressed thereon from the output circuit of tube 73 is higher or lower than the frequency value to which the split secondary winding of transformer 96 is tuned. The details of this frequency discriminator constitute no part of the present invention. Its manner of operation and arrangement are disclosed in the aforementioned application of R. F. Wild and also in the copending application, Ser. No. 537,505, filed May 26, 1944, of R. F. Wild, now Patent No. 2,532,872 of December 5, 1950, and therefore, need be only briefly described herein.

It is believed sufficient to note that if the frequency of the applied oscillating signal is the value to which the secondary winding of the intermediate frequency transformer 96 is tuned, the outputs of the diode rectifiers 100 and 101 cancel each other and zero voltage appears across the output resistor 108 of the frequency discriminator circuit 97. If the frequency of the applied oscillating signal is a value other than that to which the secondary winding of the transformer 96 is tuned, the phase relations of the voltages applied to the diode rectifiers 100 and 101 are such that their outputs do not cancel and a direct current voltage appears across the output resistor 108. The polarity of this voltage depends upon whether the frequency of the applied oscillating signal is above or below the value to which the secondary winding of the discriminator is tuned. The magnitude of the voltage depends upon the extent of departure of the frequency of the applied oscillating signal from the value to which the secondary winding is tuned.

Figure 4:
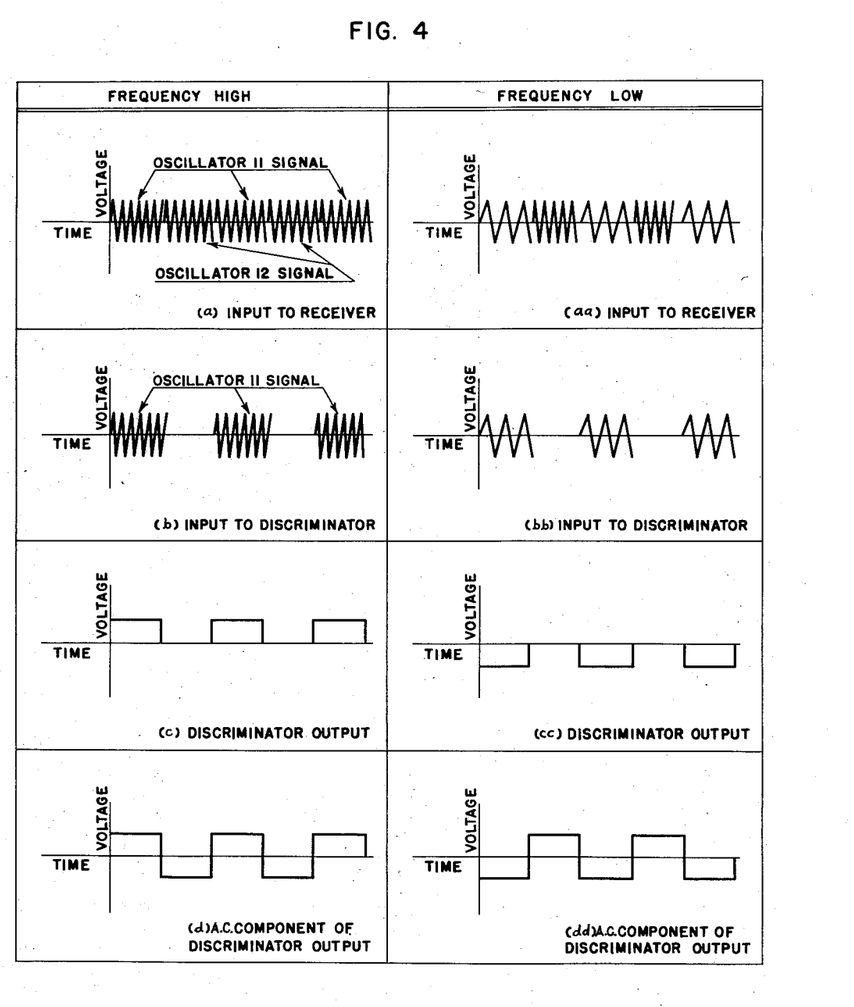
Fig. 4 shows voltage diagrams illustrating the operation of the apparatus of Figs. 1 and 2.

Recalling now that the oscillating signal which is applied to the frequency discriminator 97 is an intermittent radio frequency wave as shown in graphs (b) and (bb) of Fig. 4, it will be seen that the voltage appearing across the output resistor 108 of the discriminator will be an intermittent or pulsating direct current voltage whose polarity and magnitude are as stated above. Furthermore since the applied oscillating signal is periodically interrupted at the frequency of the alternating voltage supplied by source 23, the pulsations of direct current voltage produced across resistor 108 have the same frequency as the voltage supplied by source 23. Graphs (c) and (cc) of Fig. 4 illustrate the voltage output produced across the resistor 108 for the respective cases of high and low frequency of the applied oscillating signal.

The pulsating voltage produced across the resistor 108 may be considered as comprising two components, (1) a steady D. C. component and (2) an A. C. component. The A. C. component obtained when the frequency of the applied oscillating signal is higher than the value to which the secondary winding of the frequency discriminator is tuned is shown in graph (d) of Fig. 4 while graph (dd) of Fig. 4 illustrates the A. C. component obtained when the frequency of the applied oscillating signal is lower than the value to which the secondary winding of the frequency discriminator is tuned.

The variable condenser 112 connected in parallel with the discriminator secondary winding is a trimmer condenser and serves to provide for zero adjustments of the recording pen along the vertical coordinate. To this end the condenser 112 is provided with a suitable knob or kerf for facilitating its adjustment.

In order to provide for span adjustment or, in other words, the extent of variation of condenser 111 required to traverse the entire frequency range of operation, the variable inductance 113 is provided. Inductance 113 is preferably provided with an adjustable iron core. A suitable knob or kerf is preferably provided on the inductance 113 to facilitate its adjustment.

The zero and span adjustments described comprise no part of the present invention, but are disclosed and claimed in the application of R. F. Wild bearing Ser. No. 620,832, filed October 6, 1945, now Patent No. 2,530,928 of November 21, 1950.

The alternating component of the pulsating voltage produced across resistance 108 is amplified by a stage of voltage amplification including a tube 114, which stage of amplification incorporates a gain control for manually adjusting the sensitivity of the receiving unit. This gain control comprises the provision of slider contact 109 in association with the resistor 108 for tapping off and impressing on the input circuit of tube 114 a variable portion of the voltage produced across the resistor 108. Tube 114 may be of the commercially available type 6AC7 and includes anode, suppressor, grid, screen grid, control grid, cathode, and heater filament elements. Energizing current is supplied the heater filament from the transformer secondary winding 74. Anode voltage is supplied tube 114 from the rectifier 82 and the filter 83 and to this end the positive terminal 34 of the filter 83 is connected through a resistor 115 to the anode of tube 114, and the cathode of the latter is connected through a resistor 116 to the grounded and negative terminal of the filter. Energizing voltage is supplied the screen grid through a circuit which may be traced from the positive terminal 84 through a resistor 117 to the screen grid, the cathode, and resistor 116 to the grounded and negative terminal of the filter. A condenser 118 is connected between the screen grid of tube 114 and ground, as shown.

The output circuit of tube 114 is coupled by a condenser 119 and a resistor 120 to the input circuit of a motor drive stage indicated generally by the reference character 121. Motor drive stage 121 is shown as including triodes designated by the numerals 122 and 123, respectively, but it is preferred to utilize a number of such triodes connected in parallel with each other instead of single triodes. For example, in a practical operating embodiment of the invention, three such triodes 122 and 123 were connected in parallel, thus insuring the derivation from the motor controlled by the tubes of sufficient torque to actuate the recording pen.

As shown, the tubes 122 and 123 each include anode, control grid, cathode, and heater filament elements. Energizing voltage is supplied the heater filament elements in series from the transformer secondary winding 74. Anode voltage is supplied tubes 122 and 123 from the transformer secondary winding 81 and to this end one end terminal of winding 81 is connected to the anode of tube 122 and the other end terminal of that winding is connected to the anode of tube 123. The cathodes of tubes 122 and 123 are connected together and through a biasing resistor 124 to one terminal of the control winding 125 of a reversible two-phase induction motor 126. In addition to the winding 125, the motor 126 includes a second winding 127. A condenser 128 is connected in parallel with winding 125 and the other terminal of the latter is connected to the center tap of the transformer secondary winding 81. Accordingly, energizing current is delivered to the motor winding 125 from the transformer secondary winding 81 under control of the triodes 122 and 123. Winding 127 of the motor 126 is connected through a condenser 129 and conductors 78 and 79 to the source of alternating current 23.

Thus, the output current of the tubes 122 and 123 is utilized to deliver energy to winding 125 of the motor 126, and the secondary power winding 127 of that motor is connected to the alternating current power supply through condenser 129. The motor is actuated for rotation when an alternating current signal of the frequency of the voltage supplied by source 23 is impressed on the input circuits of tubes 122 and 123. For accomplishing this result the control grids of triodes 122 and 123 are connected together and to the junction of condenser 119 and resistor 120.

Referring to graphs (d) and (dd) of Fig. 4, it will be seen that the A. C. component of the discriminator output voltage reverses in phase when the frequency of the applied oscillating signal changes from below to above that to which the frequency discriminator is tuned. This change in phase when applied to the control grids of triodes 122 and 123 causes a decrease in the conductivity of one triode 122 or 123 and a corresponding increase in the conductivity of the other triode. In consequence, energizing current is delivered to the control winding 125 of the motor 126 which leads or lags by approximately 90° the voltage of source 23 depending upon which triode 122 or 123 has had its conduction increased. Stated differently, this change in phase of the voltage derived from the frequency discriminator causes reversal of the direction of rotation of the reversible motor 126.

The details of this motor drive circuit comprise no part of the present invention, since that circuit is the invention of Walter P. Wills and is disclosed in a copending application, Ser. No. 421,173, filed December 1, 1941, now Patent No. 2,423,540 of July 8, 1947, and hence, requires no further description herein.

The shaft of motor 126 is geared in any suitable manner, not shown in order to avoid complication of the drawing, to the variable condenser 111 connected in the frequency discriminator. The shaft of motor 126 is also mechanically coupled to the recording pen of the receiver and adjusts both the condenser 111 and the recording pen until the secondary winding of the frequency discriminator is tuned to the frequency of the applied oscillating signal. Inasmuch as the output of the frequency discriminator is zero when it is tuned to the frequency of the applied oscillating signal, the motor then stops and is maintained stationary until the frequency of the applied oscillating signal again changes.

In Fig. 2 a portion of the receiving instrument containing the recording chart is broken away to shown a pen carriage 130 which has a pen 131 mounted thereon. The carriage 130 is actuated for movement in vertical and horizontal directions by bars 132 and 133, respectively. The supporting bars for the carriage have rollers 134 and 135, respectively, on their ends, which ride on individually associated tracks 136 and 137, which are provided in the base of the receiving instrument. As the rods 132 and 133 are moved, the pen carriage 130 will be moved in any direction underneath the chart indicated generally by the reference numeral 138. If rod 132 only is moved, as upon operation of motor 126, the carriage 130 will be moved in a vertical direction only. Similarly, if rod 133 only is moved, as upon operation of motor 126', the carriage 130 will be moved in a horizontal direction only. If rods 132 and 133 are simultaneously moved, the pen carriage 130 will be moved at an angle to both sides of the instrument. Movement is imparted to the rod 132, as previously stated, by the motor 126, which has a drive pulley 139 attached to it. This pulley drives a cable 140 that passes over suitable guide pulleys at opposite ends of the track 136 and which is fastened to the roller 134. In a like manner motor 126' is utilized to impart movement to the rod 133, and to this end motor 126' has a drive pulley 141 fastened to its shaft. As the pulley 141 is rotated, it drives a cable 142 that passes around suitable guide pulleys at the ends of track 137 and which is attached to the roller 135.

In consequence, as the motors 126 and 126' are energized for rotation in one direction or the other in response to the reception of oscillating signals from the transmitter, the pen 131 will be adjusted relatively to the chart 138 to produce an exact reproduction of the movement imparted to the writing stylus or pencil at the transmitter relatively to the plotting board 4. As previously noted, upon movement of the writing stylus or pencil into engagement with the plotting board at the transmitter, the switch 7 is closed and effects energization of the solenoid 70 for lifting the recording pen up into engagement with the recording chart 138. In consequence the recording pen 131 is operative to trace the path of its movement on the chart 138 only when the writing pencil or stylus at the transmitter is in contact with the plotting board.

This arrangement in which the recording mechanism is located entirely beneath the chart, and therefore, leaves the top of the chart free for inspection and other purposes constitutes no part of the present invention but is the invention of Barnes, Johnson and Wills and is disclosed and claimed in application Ser. No. 620,828, filed by them on October 6, 1945, and now Patent No. 2,566,546 of September 4, 1951.

While, in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent, is:

1. Electrical signal transmission apparatus, comprising a transmitting portion including first and second normally operative oscillation generators each having a control circuit operative to adjust the oscillation generator between operative and inoperative conditions, having an output portion, and adapted, when in an operative condition, to produce in said output portion a continuous oscillatory output signal to be transmitted having a frequency which is above or below a predetermined frequency, depending on the direction of departure of a respective quantity from a predetermined value, and which differs from said predetermined frequency by an amount dependent upon the magnitude of said departure, said predetermined frequency being substantially the same for both of said oscillation generators, first and second electron discharge devices, each having an input circuit and an output circuit and operative, when conductive, to pass to the output circuit signals applied to the associated input circuit, keying means connected to said discharge devices and operative to maintain one of said discharge devices non-conductive during first periods in which the other of said devices is conductive and which alternate with second periods in which said other device is maintained non-conductive and said one device is conductive, means connecting each of said control circuits to a respective one of said output circuits and operative to render each of said oscillation generators inoperative when the associated one of said devices is conductive, and means connecting the output portion of each of said oscillation generators to the input circuit of the respective one of said devices to the output circuit of which there is connected the control circuit of the other of said oscillation generators, whereby each of said devices, when conductive, passes to its output circuit the signal produced by one of said oscillation generators and simultaneously renders the other of said oscillation generators inoperative, said transmission apparatus also comprising a receiving portion including first and second normally operative receiving devices each having an input circuit, an output circuit, and a frequency discriminating circuit and adapted, when operative, to produce in the last mentioned output circuit a signal whose direction is dependent upon the direction of departure from said predetermined frequency of the frequency of a signal applied to the last mentioned input circuit, and whose magnitude is dependent upon the magnitude of the last mentioned departure, and keying means connected to said receiving devices and operative to maintain one of said receiving devices inoperative and the other of said receiving devices operative during the aforementioned first periods, and operative to maintain said other of said receiving devices inoperative and said one of said receiving devices operative during the aforementioned second periods, a single transmission circuit connected between both of the first mentioned output circuits and both of said last mentioned input circuits, whereby the signals appearing in said first mentioned output circuits are applied to said last mentioned input circuits, and a load device connected to each of said last mentioned output circuits.

2. Apparatus as specified in claim 1, wherein each of said electron discharge devices includes an anode included in its output circuit, a screen grid, and a control grid, one of said grids being included in the input circuit of the discharge device, and wherein the first mentioned keying means includes means adapted to impress a regularly fluctuating keying signal on the other of the grids of one of said discharge devices, and adapted to impress on the other of the grids of the other of said discharge devices a second regularly fluctuating keying signal which is substantially 180 degrees out of phase with the first mentioned keying signal and which has a frequency which is the same as that of said first mentioned keying signal.

3. Apparatus as specified in claim 1, wherein each of said electron discharge devices includes an anode included in its output circuit, a screen grid included in its input circuit, and a control grid, and wherein the first mentioned keying means includes means adapted to impress a regularly fluctuating keying signal on the control grid of one of said discharge devices, and adapted to impress on the control grid of the other of said discharge devices a second regularly fluctuating keying signal which is substantially 180 degrees out of phase with the first mentioned keying signal and which has a frequency which is the same as that of said first mentioned keying signal.

4. Apparatus as specified in claim 1, wherein each of said electron discharge devices includes an anode included in its output circuit, a control grid included in its input circuit, and a screen grid, and wherein the first mentioned keying means includes means adapted to impress a regularly fluctuating keying signal on the screen grid of one of said discharge devices, and adapted to impress on the screen grid of the other of said discharge devices a second regularly fluctuating keying signal which is substantially 180 degrees out of phase with the first mentioned keying signal and which has a frequency which is the same as that of said first mentioned keying signal.

5. Apparatus as specified in claim 1, wherein the first mentioned keying means includes means adapted to connect one of said electron discharge devices to a source of regularly fluctuating potential, and adapted to connect the other of said discharge devices to a source of regularly fluctuating potential of the same frequency as the first mentioned fluctuating potential but substantially 180 degrees out of phase therewith, and wherein the second mentioned keying means includes means adapted to connect one of said receiving devices to a source of regularly fluctuating potential of the same frequency and of substantially the same phase as said first mentioned fluctuating potential, and adapted to connect the other of said receiving devices to a source of regularly fluctuating potential of the same frequency and of substantially the same phase as the second mentioned fluctuating potential, each of said fluctuating potentials being derived from the same source of regularly fluctuating electrical energy.

6. Electrical signal transmission apparatus, comprising a transmitting portion including first and second normally operative oscillation generators each having an output portion and adapted, when in an operative condition, to produce in said output portion a continuous oscillatory output signal to be transmitted having a frequency which is above or below a predetermined frequency, depending on the direction of departure of a quantity from a predetermined value, and which differs from said predetermined frequency by an amount dependent upon the magnitude of said aperture, said predetermined frequency being substantially the same for both of said oscillation generators, first and second electron discharge devices, each associated with a corresponding one of said oscillation generators and operative to control the operation thereof, and keying means connected to said discharge devices and operative to render one of said oscillation generators inoperative during first periods which alternate with second periods in which the other oscillation generator is rendered inoperative, said keying means including means adapted to connect one of said discharge devices to a source of regularly fluctuating potential, and adapted to connect the other of said discharge devices to a source of regularly fluctuating potential of the same frequency as the first mentioned fluctuating potential but substantially 180 degrees out of phase therewith, said transmission apparatus also comprising a receiving portion including first and second normally operative receiving devices each having an input circuit, an output circuit, and a frequency discriminating circuit and adapted, when operative, to produce in said output circuit a signal whose direction is dependent upon the direction of departure from said predetermined frequency of the frequency of a signal applied to said input circuit, and whose magnitude is dependent upon the magnitude of the last mentioned departure, and keying means connected to said receiving devices and operative to maintain one of said receiving devices inoperative and the other of said receiving devices operative during the aforementioned first periods, and operative to maintain said other of said receiving devices inoperative and said one of said receiving devices operative during the aforementioned second periods, the last mentioned keying means including means adapted to connect one of said receiving devices to a source of regularly fluctuating potential of the same frequency and of substantially the same phase as said first mentioned fluctuating potential, and adapted to connect the other of said receiving devices to a source of regularly fluctuating potential of the same frequency and of substantially the same phase as the second mentioned fluctuating potential, each of said fluctuating potentials being derived from the same source of regularly fluctuating electrical energy, a transmission circuit connected between each of said output portions and each of said input circuits, and a load device connected to each of said output circuits.

RUDOLF F. WILD.
FRED J. CURRAN.

REFERENCES CITED

The following references are of record in the file of this patent:

UNITED STATES PATENTS

| Number | Name | Date |
| --- | --- | --- |
| 2,172,918 | Watts | Sept. 12, 1939 |
| 2,274,638 | Rosene | Mar. 3, 1942 |
| 2,365,450 | Bliss | Dec. 19, 1944 |
| 2,409,559 | Haight | Oct. 15, 1946 |
| 2,436,563 | Frosch | Feb. 24, 1948 |
| 2,446,392 | Rey | Aug. 3, 1948 |